(12) United States Patent
Angoth et al.

(10) Patent No.: US 10,452,574 B2
(45) Date of Patent: Oct. 22, 2019

(54) READ PERFORMANCE ON A SATA STORAGE DEVICE BEHIND A HOST BUS ADAPTER

(71) Applicant: Intel Corporation, Santa Clara, CA (US)

(72) Inventors: Vivek Angoth, Boulder, CO (US); Hung Huynh, Sacremento, CA (US); Daniel McLeran, Loveland, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/046,850

(22) Filed: Jul. 26, 2018

(65) Prior Publication Data

US 2019/0042493 A1 Feb. 7, 2019

(51) Int. Cl.
*G06F 13/376* (2006.01)
*G06F 13/16* (2006.01)
*G06F 13/42* (2006.01)
*G06F 13/38* (2006.01)

(52) U.S. Cl.
CPC ........ *G06F 13/1668* (2013.01); *G06F 13/385* (2013.01); *G06F 13/4282* (2013.01); *G06F 2213/0032* (2013.01)

(58) Field of Classification Search
CPC .................................................. G06F 13/376
See application file for complete search history.

(56) References Cited

U.S. PATENT DOCUMENTS

| | | | | | |
|---|---|---|---|---|---|
| 6,094,436 | A | * | 7/2000 | Runaldue | G06F 5/06 370/420 |
| 7,110,419 | B1 | * | 9/2006 | Linander | H04L 12/2801 370/461 |
| 7,827,320 | B1 | * | 11/2010 | Stevens | G06F 3/0611 710/5 |
| 2004/0257204 | A1 | * | 12/2004 | Liao | G06K 7/0008 340/10.2 |
| 2014/0006498 | A1 | * | 1/2014 | Liu | H04L 67/02 709/204 |
| 2017/0371806 | A1 | * | 12/2017 | Ritchie | G06F 12/1072 |

* cited by examiner

*Primary Examiner* — Farley Abad
(74) *Attorney, Agent, or Firm* — Compass IP Law, PC

(57) ABSTRACT

Examples may include a storage device coupled to a host bus adapter and a SATA controller over a SATA interface. The storage device includes a memory and a storage device controller. The storage device controller includes a collision detector and counter component to detect and count collisions on the SATA interface for a period of time; and a bus limiter component to detect a type of workload on the SATA interface, and when the detected workload is only read commands and a number of detected collisions is less than a detected collision threshold during the period of time, to set a limit on a maximum number of commands sent by the host bus adapter to the storage device controller over the SATA interface.

18 Claims, 3 Drawing Sheets

READ PERFORMANCE ON A SATA STORAGE DEVICE BEHIND A HOST BUS ADAPTER

TECHNICAL FIELD

Examples described herein are generally related to input/output (I/O) performance of a storage device of a computing system.

BACKGROUND

In some situations, when a serial AT attachment (SATA) mass storage device is connected to a certain host bus adapter (HBA) as opposed to a SATA onboard controller there can be up to a 25% regression in high queue-depth, 4K Random Read QD32 performance. This happens because the HBA monopolizes the bus until it sends all 32 commands to the storage device and then relinquishes the bus to wait for the storage device to respond to all 32 commands. This results in using the bus inefficiently and causes a performance regression in random read-intensive workloads.

DETAILED DESCRIPTION

As contemplated in the present disclosure, a method to improve the read performance when a SATA storage device is coupled to a HBA is shown without reducing the read performance when the storage device is coupled to a SATA onboard controller. A transfer ready (XRDY) collision occurs when the host and the storage device want a SATA interface to transmit simultaneously. There are few to no XRDY collisions on the SATA interface when the storage device is coupled to a HBA. Reducing the number of commands the storage device firmware processes before sending a response in the absence of XRDY collisions reduces the amount of time the host or the storage device monopolizes the SATA interface and hence the SATA interface is used more efficiently.

Figure 1:
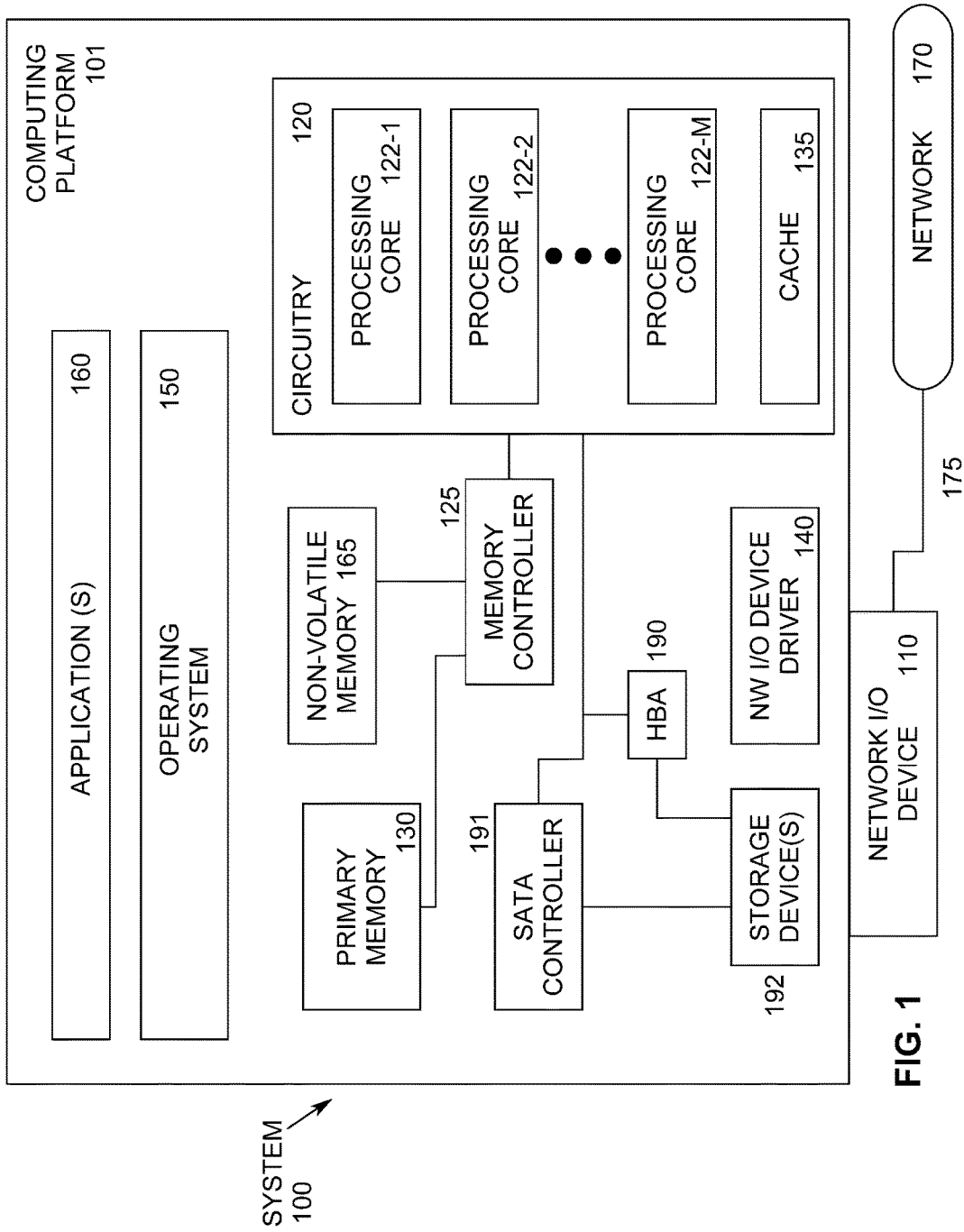
FIG. 1 illustrates an example computing platform.

FIG. 1 illustrates an example simplified computing platform 100. As shown in FIG. 1, computing system 100 includes a computing platform 101 coupled to a network 170. In some examples, as shown in FIG. 1, computing platform 101 couples to network 170 via a network communication channel 175 and through a network I/O device 110 (e.g., a network interface controller (NIC)) having one or more ports connected or coupled to network communication channel 175.

According to some examples, computing platform 101, as shown in FIG. 1, includes circuitry 120, primary memory 130 (which may be volatile), non-volatile memory (NVM) 165, memory controller 125, a network (NW) I/O device driver 140, an operating system (OS) 150, one or more application(s) 160. In some examples, as shown in FIG. 1, circuitry 120 communicatively couple to primary memory 130 and NVM 165 via memory controller 125. In other examples, memory controller 125 is integral with processor circuitry 120. Although not shown in FIG. 1, in some examples, operating system 150, NW I/O device driver 140 or application(s) 160 are implemented, at least in part, via cooperation between one or more memory devices included in primary memory 130 (e.g., volatile or NVM devices), NVM 165 and elements of circuitry 120 such as processing cores 122-1 to 122-$m$, where "m" is any positive whole integer greater than 2.

In some examples, computing platform 101, may include, but is not limited to, a server, a server array or server farm, a web server, a network server, an Internet server, a work station, a mini-computer, a main frame computer, a personal computer, a smart phone, a tablet computer, a supercomputer, a network appliance, a web appliance, a distributed computing system, multiprocessor systems, processor-based systems, or a combination thereof. Also, circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors; and similar processors. Circuitry 120 may include at least one cache 135 to store data. In an embodiment, circuitry 120 includes a main printed circuit board (PCB) or "motherboard" of the computing platform.

According to some examples, primary memory 130 and/or NVM 165 are composed of one or more memory devices or dies which may include various types of volatile and/or non-volatile memory. Volatile types of memory include, but are not limited to, dynamic random-access memory (DRAM), static random-access memory (SRAM), thyristor RAM (TRAM) or zero-capacitor RAM (ZRAM). Non-volatile types of memory include byte or block addressable types of non-volatile memory having a 3-dimensional (3-D) cross-point memory structure that includes chalcogenide phase change material (e.g., chalcogenide glass) hereinafter referred to as "3-D cross-point memory" (such as 3D XPoint™ commercially available from Intel Corporation). Non-volatile types of memory also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In one example, primary memory 130 is a volatile memory.

Computing platform 101 also includes host bus adapter 190 coupled to at least one storage device 192. HBA 190 is circuitry that provides input/output (I/O) processing and physical connectivity between the computing platform, and the storage device. Because an HBA typically relieves the host processor of both data storage and retrieval tasks, an HBA can improve the computer platform's performance time. HBA 190, coupled to a peripheral component interface express (PCIe) interconnect in one embodiment, has multiple SATA ports so that multiple SATA-compliant storage devices can be connected. Computing platform 101 also includes SATA controller 191 on the motherboard of computing platform 101 which may also be coupled to SATA storage device(s) 192. HBA 190 and SATA controller 192 have shared access to storage device(s) over a SATA interface but cannot connect to a given storage device at the same time.

Figure 2:
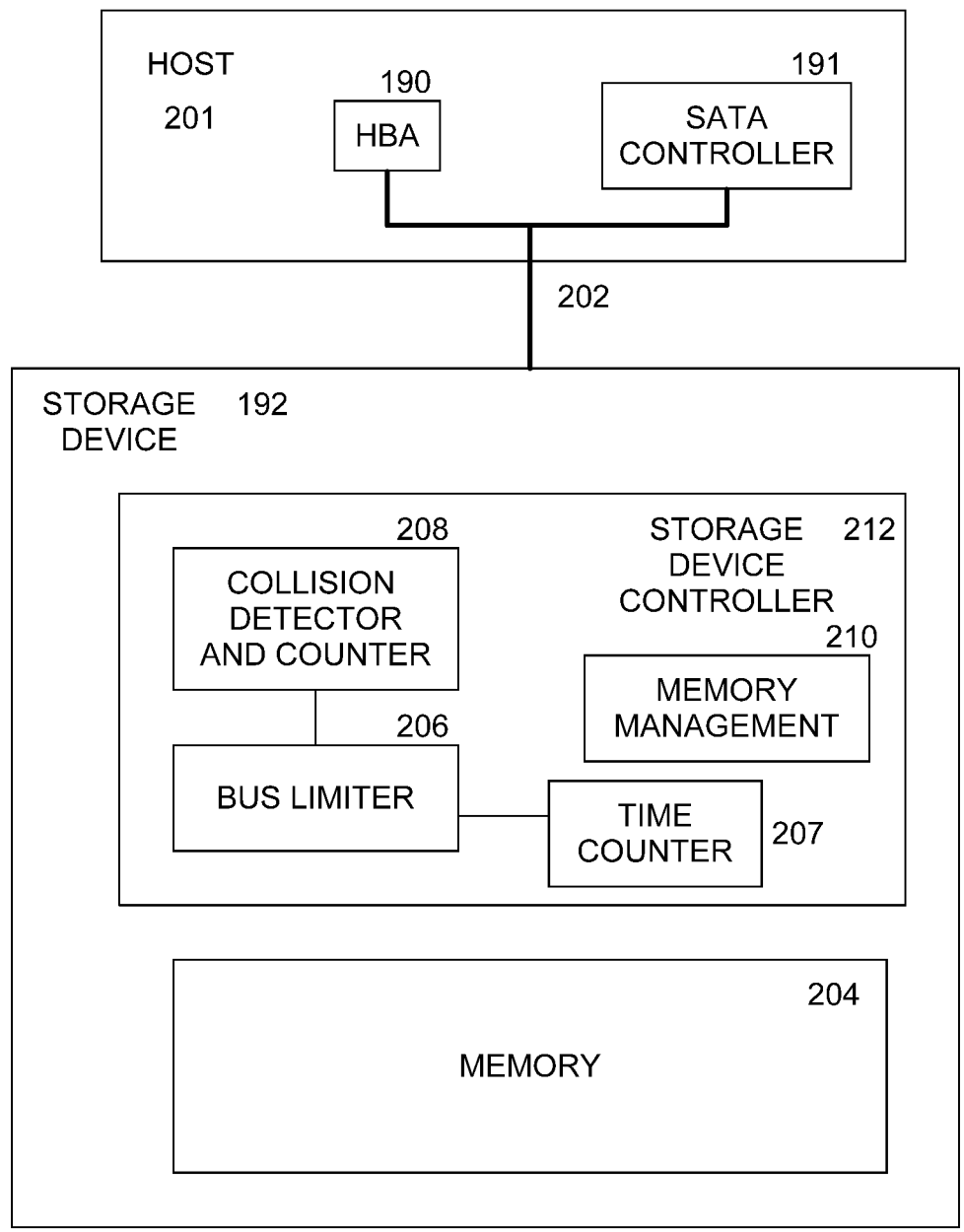
FIG. 2 illustrates an example of a HBA and SATA Controller interfacing to a storage device.

FIG. 2 illustrates an example diagram 200 of HBA 190 and SATA controller 191 interfacing to a storage device. Although only one storage device is shown in FIG. 2, HBA 190 and SATA controller 191 may be coupled to a plurality of storage devices (e.g., such as a plurality of SSDs). In an embodiment, host 201, which includes at least some of the components of computing platform 101 of FIG. 1, includes HBA 190 and SATA controller 191. HBA 190 couples with storage device 192 over SATA interface 202. SATA controller 191 also couples with storage device 192 over SATA interface 202. In an embodiment, storage device 192 is a solid-state driver (SSD). In another embodiment, storage device 192 is a hard disk drive. In other embodiments, other types of storage devices may also be used. Storage device 192 includes storage device controller circuitry 212, which includes logic to control the operation of the storage device (e.g., reading and writing of data). Storage device 192 also includes at least one memory 204. In an embodiment, memory 202 are composed of one or more memory devices or dies which may include various types of volatile and/or non-volatile memory. Volatile types of memory include, but are not limited to, dynamic random-access memory (DRAM), static random-access memory (SRAM), thyristor RAM (TRAM) or zero-capacitor RAM (ZRAM). Non-volatile types of memory include byte or block addressable types of non-volatile memory having a 3-dimensional (3-D) cross-point memory structure that includes chalcogenide phase change material (e.g., chalcogenide glass) hereinafter referred to as "3-D cross-point memory" (such as 3D XPoint™ commercially available from Intel Corporation). Non-volatile types of memory also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above.

Storage device controller 212 includes bus limiter component 206 to execute circuitry, firmware and/or software code to control setting limitations on the SATA interface. Storage device controller 212 includes memory management circuitry 210 to control the reading of data from and writing of data to memory 204 as is known in the art. In an embodiment, storage device controller 212 also includes collision detector and counter circuitry 208. This component detects collisions on SATA interface 202 and maintains a count of the collisions for a specified period of time. Storage device controller 212 also includes a time counter 207 to maintain a timer used by the storage device controller to control operations as shown below in FIG. 3. In the example shown in FIG. 2, components 206, 207, 208, and 210 are depicted as separate logical components within storage device controller 212. In other embodiments, one or more of these components may be combined according to design requirements.

The read performance of the storage device may be analyzed when used behind onboard SATA controller 191 and running a random read workload. The read performance of the storage device drops when the storage device is put behind HBA 190.

In an embodiment, the number of transfer ready (XRDY) collisions on SATA interface 202 are detected for a predetermined period of time. If the number of collisions is less than a predetermined threshold in the predetermined amount of time, it can be determined that the SATA interface (i.e., the bus) is not being used efficiently. In this case the number of read commands allowed on the bus to be received by the storage device controller may be limited by bus limiter 206 to improve bus transfer efficiency. This enables computing platforms to achieve improved read performance on HBAs monopolizing the bus when communicating with a storage device without compromising the read performance of an onboard SATA controller also communicating with the storage device. The present approach does not impact write workload performance.

By analyzing the bus traffic when the storage device is connected to SATA onboard controller 190, it can be observed that I/O commands sent from the SATA onboard controller 190 are interleaved by responses from the storage device controller 192. This shows that the host/storage device communication is using the bus 202 as efficiently as possible. In this case there are lot of collisions on the bus as the host and the storage device are trying to send commands at almost the same time. This should cause the host or storage device to wait, hence affecting performance. This issue is typically solved by the storage device controller by adding a slight delay before sending out data to the host. This allows interleaving of host and storage device commands and hence bus is used efficiently.

By analyzing the bus traffic when the storage device is connected to HBA 190, it can be observed that the host monopolizes the bus until it sends all 32 commands (for example) of a workload. For current SATA interface 202, the queue depth is 32. This is the maximum number of commands that can be sent on the interface at a time (other interfaces or future versions of SATA interfaces may have a different maximum number of commands). The storage device then monopolizes the bus to send back data for all 32 commands. In this case there are no XRDY collisions as the host and storage device are not trying to use the bus at the same time. This case leads to the bus being used inefficiently as there is no interleaving of commands.

In order to reduce the time in which the host or the storage device is hogging the bus, in an embodiment the number of commands on the bus is limited to less than the maximum number, such as eight (in one example), so that eight commands from the host can be interleaved with eight commands from the storage device. This helps improve bus efficiency. In one embodiment, eight commands have been chosen as an appropriate limit because using a lower number would mean that the queue depth of the storage device is not being used appropriately and hence performance may be reduced. This "limited bus mode" cannot be continuously operated however because this reduces performance when the storage device is put on an onboard SATA controller. Hence, a method is needed to shift between the normal mode of operation and the mode of operation where the number of commands on the bus is limited.

At periodic intervals the number of XRDY collisions on the bus is checked. This is done to detect whether the storage device is behind an HBA 190 or an onboard SATA controller 191. The logic behind this is that when the drive is connected to an HBA there are fewer collisions, whereas when the storage device is connected to a SATA onboard controller there are more collisions since the storage device and host are trying to use the Bus at the same time. In an embodiment the number of collisions on the bus is obtained from circuitry (such as a register) in collision detector and counter circuitry 208 in storage device controller 212 which counts every time a collision is detected on the bus. If the number of collisions is less than a certain predetermined collision threshold, the number of commands on the bus to be received by the storage device controller is limited (since the HBA is currently being used). In one embodiment, the threshold is set to eight. The limit is enforced by not allowing the storage device to send data/responses for more than eight host commands at a time. This allows the host to send the next eight commands and thus helps improve the bus efficiency. If the number of collisions detected were more than predetermined collision threshold in the given amount of time, the storage device controller removes bus limitation.

Figure 3:
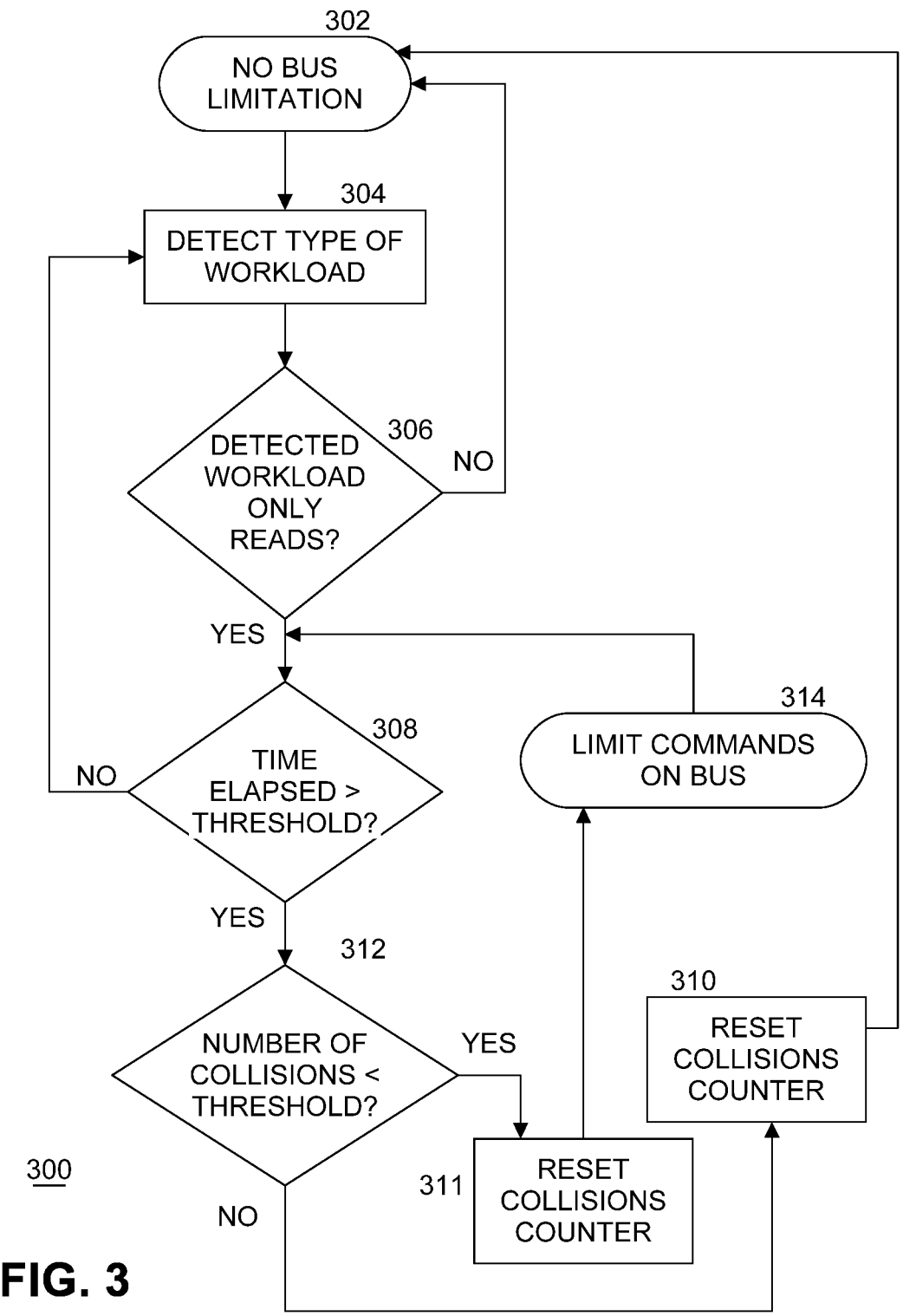
FIG. 3 illustrates an example flow diagram of adaptively controlling command throttling of a SATA interface.

FIG. 3 illustrates an example flow diagram 300 of adaptively controlling command throttling of SATA interface 202. By default, there is no bus limitation at block 302 (i.e., no throttling of commands on the bus). At block 304, bus limiter 206 detects a type of workload on the bus. The type of workload is the types of I/O commands that are being sent over the bus. The types include only read commands, only write commands, or a combination of at least one read command and at least one write command during a predetermined period of time. At block 306, if the detected workload comprises write commands, or a combination of reads and writes, then no change to the bus limitation is needed and processing reverts back to block 302. If there is currently a limit on the number of commands on the bus, the bus limitation is removed. If the detected workload is only read commands, then time counter 207 is checked by bus limiter 206 at block 308. In an embodiment a time counter is used by the storage device controller to only check the workload periodically. For example, in one embodiment the time threshold is set to 100 milliseconds. Other time thresholds may also be used. If the time threshold is not reached, then processing waits for a period of time and returns to block 304 to detect the workload. If the time threshold is reached, processing continues with block 312 where the number of XRDY collisions on the bus for the current period of time stored by collision detector and counter 208 is checked by bus limiter 206. If the number of XRDY collisions is not less than a predetermined collision threshold of detected XRDY collisions, then no change to the bus limitation is needed (SATA controller is being used), the collisions counter is reset at block 311 and processing reverts to block 302. However, if the number of XRDY collisions reaches or exceeds the detected collision threshold of detected XRDY collisions, then the collisions counter is reset at block 310 and the number of commands allowed on the bus to be received by the storage device controller is limited at block 314. Processing continues with another time check at block 308.

Various components of computing platform 101 and/or storage device 192 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

It should be appreciated that the exemplary computing platforms and storage devices shown in the Figures may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a storage device controller, coupled to a host bus adapter and a SATA controller over a SATA interface, the storage device controller comprising
a collision detector and counter component to detect and count collisions on the SATA interface for a period of time; and
a bus limiter component to detect a type of workload on the SATA interface, and when the detected workload is only read commands and a number of detected collisions is less than a detected collision threshold during the period of time, to set a limit on a maximum number of commands received by the storage device controller over the SATA interface.

2. The apparatus of claim 1, the bus limiter to remove the limit when the detected workload is not only read commands.

3. The apparatus of claim 1, the bus limiter to remove the limit when the number of detected collisions is not less than the detected collision threshold.

4. The apparatus of claim 1, the collisions comprising one or more transfer ready (XRDY) collisions on the SATA interface.

5. The apparatus of claim 1, the bus limiter to reset the collision detector and counter when a predetermined period of time has elapsed.

6. The apparatus of claim 1, wherein the limit on the maximum number of commands is less than a queue depth of the SATA interface.

7. A storage device comprising:
a memory; and
a storage device controller, coupled to the memory, and coupled to a host bus adapter and a SATA controller over a SATA interface, the storage device controller comprising
a collision detector and counter component to detect and count collisions on the SATA interface for a period of time; and
a bus limiter component to detect a type of workload on the SATA interface, and when the detected workload is only read commands and a number of detected collisions is less than a detected collision threshold during the period of time, to set a limit on a maximum number of commands received by the storage device controller over the SATA interface.

8. The storage device of claim 7, the bus limiter to remove the limit when the detected workload is not only read commands.

9. The storage device of claim 7, the bus limiter to remove the limit when the number of detected collisions is not less than the detected collision threshold.

10. The storage device of claim 7, the collisions comprising one or more transfer ready (XRDY) collisions on the SATA interface.

11. The storage device of claim 7, the bus limiter to reset the collision detector and counter when a predetermined period of time has elapsed.

12. The storage device of claim 7, wherein the limit on the maximum number of commands is less than a queue depth of the SATA interface.

13. The storage device of claim 7, the memory comprising a NAND memory.

14. A method comprising:
detecting and counting collisions on a SATA interface for a period of time, the SATA interface coupling a host bus adapter and a SATA controller to a storage device controller of a storage device;
detecting a type of workload on the SATA interface, and setting a limit on a maximum number of commands received by the storage device controller over the SATA interface when the detected workload is only read commands and a number of detected collisions is less than a detected collision threshold during the period of time.

15. The method of claim 14, comprising removing the limit when the detected workload is not only read commands.

16. The method of claim 14, comprising removing the limit when the number of detected collisions is not less than the detected collision threshold.

17. The method of claim 14, the collisions comprising one or more transfer ready (XRDY) collisions on the SATA interface.

18. The method of claim 14, comprising resetting the collision detector count when a predetermined period of time has elapsed.

* * * * *